United States Patent
Anderson, Jr. et al.

(10) Patent No.: US 11,944,029 B2
(45) Date of Patent: Apr. 2, 2024

(54) SYSTEMS AND METHODS FOR DIAGNOSING SOIL CHARACTERISTICS AND SUBTERRANEAN PLANT CHARACTERISTICS

(71) Applicant: GroundTruth Ag, Inc., Raleigh, NC (US)

(72) Inventors: John Richard Anderson, Jr., Raleigh, NC (US); Graham Hunter Bowers, Raleigh, NC (US)

(73) Assignee: GroundTruth Ag, Inc., Arlington, VA (US)

( * ) Notice: Subject to any disclaimer, the term of this patent is extended or adjusted under 35 U.S.C. 154(b) by 219 days.

(21) Appl. No.: 17/378,006

(22) Filed: Jul. 16, 2021

(65) Prior Publication Data

US 2022/0022362 A1 Jan. 27, 2022

Related U.S. Application Data

(60) Provisional application No. 63/055,225, filed on Jul. 22, 2020.

(51) Int. Cl.
| | |
|---|---|
| A01B 79/00 | (2006.01) |
| A01B 33/10 | (2006.01) |
| G06N 20/00 | (2019.01) |
| G06T 17/05 | (2011.01) |

(52) U.S. Cl.
CPC ............ *A01B 79/005* (2013.01); *A01B 33/10* (2013.01); *G06N 20/00* (2019.01); *G06T 17/05* (2013.01)

(58) Field of Classification Search
CPC ...... A01B 79/005; A01B 33/10; G06N 20/00; G06T 17/05
See application file for complete search history.

(56) References Cited

U.S. PATENT DOCUMENTS

| | | | | |
|---|---|---|---|---|
| 4,492,111 | A * | 1/1985 | Kirkland | G01N 33/24 73/9 |
| 10,983,489 | B2 * | 4/2021 | Jennings | B05B 12/12 |
| 2006/0158652 | A1 * | 7/2006 | Rooney | G01N 21/251 356/406 |

(Continued)

OTHER PUBLICATIONS

Castrignano et al., A Combined Approach of Sensor Data Fusion and Multivariate Geostatistics for Delineation of Homeogeneous Zones in an Agricultural Field, www.mdpi.com/journal/sensors, 2017, 20 pgs (Year: 2017).*

(Continued)

*Primary Examiner* — Raymond L Nimox
(74) *Attorney, Agent, or Firm* — Padda Law Group

(57) ABSTRACT

Methods, systems and devices for mobile detection of soil compaction and soil characteristic data are provided. Operations include causing a subsurface portion of soil at a compaction detection location to be disrupted using compressed air, generating disruption data corresponding to the disruption of the subsurface portion of the soil at the compaction detection location, generating geographic location data corresponding to the compaction detection location, receiving the geographic location data from the location device and the disruption data from the disruption sensor and associating the geographic location data with the disruption data.

19 Claims, 6 Drawing Sheets

(56) References Cited

U.S. PATENT DOCUMENTS

| | | | | |
|---|---|---|---|---|
| 2011/0110727 | A1* | 5/2011 | Plahert | E02D 3/12 |
| | | | | 405/269 |
| 2013/0036689 | A1* | 2/2013 | Kuchel | E02D 35/00 |
| | | | | 52/741.1 |
| 2014/0178132 | A1* | 6/2014 | Koehler | E02D 3/054 |
| | | | | 405/271 |
| 2016/0108606 | A1* | 4/2016 | Strutynsky | E02F 5/103 |
| | | | | 37/351 |
| 2017/0090068 | A1* | 3/2017 | Xiang | G01W 1/10 |
| 2018/0249620 | A1* | 9/2018 | Hardman | A01C 23/026 |
| 2019/0353631 | A1* | 11/2019 | Koshnick | A01C 21/005 |
| 2020/0184214 | A1* | 6/2020 | Casas | G06N 3/006 |
| 2021/0120730 | A1* | 4/2021 | Anderson | G06Q 10/047 |
| 2022/0201919 | A1* | 6/2022 | Tõkés | A01G 29/00 |

OTHER PUBLICATIONS

Koganti et al., Mapping of Agricultural Subsurface Drainage Systems Using a Frequency-Domain Ground Penetrating Radar and Evaluating its Perofrmance Using a Single-Frequency Multi-Receiver Electromagnetic Induction Instrument, www.mdpi.com/journal/sensors, 2020, 28 pgs (Year: 2020).*

Thessler et al., Geosensors to Suppor Crop Production: Current Applications and User Requirements, www.mdpi.com/journal/sensors, 2011, 29 pgs (Year: 2011).*

* cited by examiner

SYSTEMS AND METHODS FOR DIAGNOSING SOIL CHARACTERISTICS AND SUBTERRANEAN PLANT CHARACTERISTICS

CROSS REFERENCE TO RELATED APPLICATIONS

The present application claims domestic priority to U.S. Provisional Patent Application No. 63/055,225, filed on Jul. 22, 2020, the disclosure and content of which are incorporated by reference herein in their entirety,

BACKGROUND

The present disclosure relates to agronomy, artificial intelligence (machine learning) and crop improvement.

As crop producers scale farming operations to satisfy the global demand for food and commodities, farm machinery continues to increase in size, weight and power. Experts agree that heavy equipment moving across crop fields may cause formation of compacted subsoil layers that restrict root growth and reduce yields by 10% to 20%. Soil compaction can be also caused by repeated use of specific implements, such as a moldboard plow or a rototiller. Soil compaction may adversely affect large and small acreage farmers. Conventional remedies for soil compaction may include: deep "ripping" with tillage implements that may be slow and expensive; installation of costly low-pressure tires on heavy machinery; and controlled traffic that is impractical for the vast majority of producers.

Soil compaction may be a dynamic phenomenon that, at any specific site, can change precipitously in response to climatic conditions, natural geological processes, microbial activity, characteristics of crops being grown and/or direct management. Current tillage practices may dictate that producers treat all portions of a given field the same even though empirical evidence and recent studies suggest that yield-limiting compaction varies significantly within crop fields. Methods for tilling only portions of fields to areas in which compaction is yield limiting may be advantageous.

The approaches described in the Background section could be pursued but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

Some embodiments herein are directed to systems that diagnose soil characteristics and subterranean plant characteristics. Embodiments herein are directed to systems including a soil disruption device that is configured to cause a disruption of a subsurface portion of soil at a compaction detection location, a disruption sensor that is configured to generate disruption data corresponding to the disruption of the subsurface portion of the soil at the compaction detection location, a location device that is configured to provide geographic location data corresponding to the compaction detection location and a processor circuit that is configured to receive the geographic location data from the location device and the disruption data from the disruption sensor and to associate the geographic location data with the disruption data.

Some embodiments are directed to methods that include operations of causing a subsurface portion of soil at a compaction detection location to be disrupted using compressed air, generating disruption data corresponding to the disruption of the subsurface portion of the soil at the compaction detection location, generating geographic location data corresponding to the compaction detection location, receiving the geographic location data from the location device and the disruption data from the disruption sensor and associating the geographic location data with the disruption data.

Other methods, computer program products, devices and systems according to embodiments of the present disclosure will be or become apparent to one with skill in the art upon review of the following drawings and detailed description. It is intended that all such additional methods, computer program products, and systems be included within this description, be within the scope of the present disclosure, and be protected by the accompanying claims. Moreover, it is intended that all embodiments disclosed herein can be implemented separately or combined in any way and/or combination.

BRIEF DRAWING DESCRIPTION

DETAILED DESCRIPTION

Figure 1:
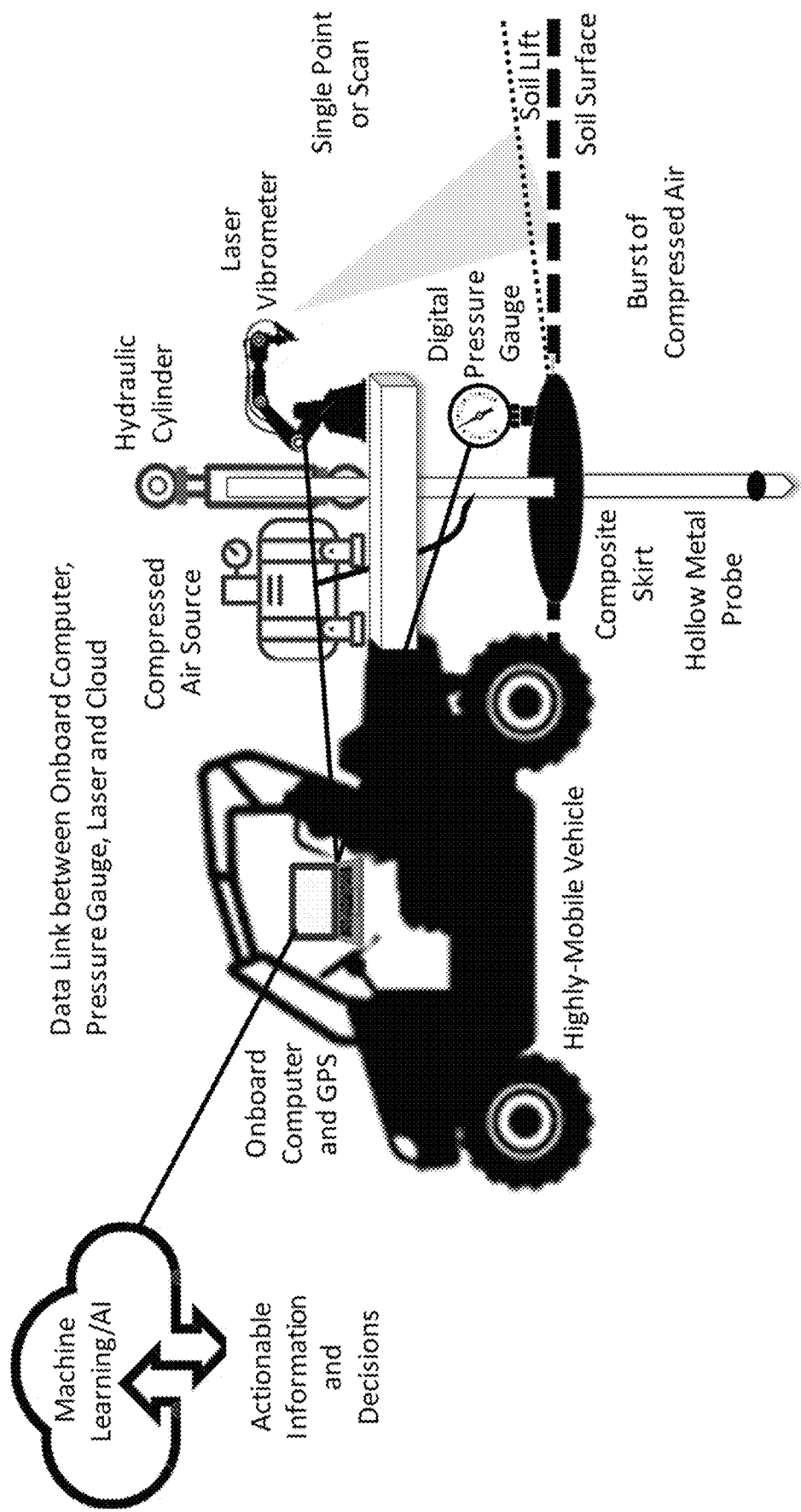
FIG. 1 is a schematic rendering of a system for diagnosing soil characteristics and subterranean plant characteristics according to some embodiments.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Some embodiments herein may result in significant fuel savings, time savings and financial benefits that accrue to producers who till only portions of a field where compaction is yield-limiting and till only to the depth required to mitigate yield-limiting compaction. To realize advantages of such a site-specific tillage concept, a swift, practicable method for regularly assessing soil compaction at different soil depths across wide geographical areas may be needed.

Like farmers and agronomists, civil engineers and soil scientists are concerned about soil compaction. Whereas crop producers want to reduce soil density, engineers working on highway and construction projects strive to mechanically increase soil density. All would benefit from a compaction diagnosis method that is rapid, accurate, durable, portable and economical.

Methods used to diagnose soil compaction in farm fields may range from crude to prohibitively complex. Such approaches may include resistance to a metal rod pushed into the soil, digital cone penetrometers (DCP), sophisticated ground-penetrating radars (GPR) and electromagnetic induction sensors (EMI), among others. On construction sites, compaction detection methods may include nuclear surface gauges, DCPs, sand cone tests and balloon densometers, among others. Seismic/acoustic methods involving a hammer ring or sound pumped into soil can also be used to estimate soil density. For one striving to assess soil compaction under a wide range of soil conditions, all of the above methods may have shortcomings. Some are expensive. Some require substantial training and expertise. Some include waiting for results from a distant laboratory. Others are excessively time consuming and can't be scaled to accommodate crop producers or large construction projects. Additionally, using such methods may provide inconsistent results when the conditions like soil moisture and organic matter levels fluctuate widely. Thus, a simple, economical, test that accurately assesses soil compaction and that provides insight into the readiness of soil for plant growth or construction may be beneficial.

Some embodiments disclosed herein may provide compaction testing that may be performed onsite in situ. As such, some embodiments may be portable and rapid enough to support data acquisition across large fields and construction sites. Embodiments may provide quick transformation of data into visualizations that are actionable and digital prescriptions that can be executed by equipment and management onsite. Further, direct and (near) real time integration of machine learning and other forms of artificial intelligence may be included in embodiments herein.

Some embodiments herein use real time machine learning and AI to mitigate decision-making complexity caused by the disposition of heterogeneous soils and the vacillating nature of soil compaction. The inclusion of machine learning/AI in present embodiments may provide useful results when soil moisture, soil chemical attributes and organic matter levels fluctuate.

Air permeameters are generally immobile and are generally found in the laboratory. Such devices used to study the integrity of and flow of materials through media with inherent pore space, e.g. asphalt and soils. In numerous laboratory studies and an occasional field study, air permeameters have been used to examine soil samples and intact soil cores. Collectively, results from those experiments support the idea that air movement can be leveraged to "discriminate between structural differences in soil under different management practices."

Modern laser technologies may be useful to characterize surfaces and movement of those surfaces in extreme detail. In complex laboratory settings, scanning and 3-dimensional lasers have been used to examine the structure of rocks and soil. Some embodiments described herein use lasers to describe soil physical characteristics that are not in soil samples or cores, but instead are in their natural state, in situ, i.e. in agricultural fields and on construction sites. For example, lasers may be deployed to evaluate the physical response of soils to management in agricultural fields and on construction sites, e.g. including evaluation of tillage systems and the mechanical performance of soil-disturbing implements.

Many crop scientists believe that the next frontier in global crop improvement lies below ground. Rooting patterns of crops and differences in the rooting characteristics of cultivars are subtle yet critical to stress tolerance and final crop yield. Underground aspects of crop root performance may be difficult to characterize using conventional approaches. New approaches, for example, "imaging" roots from at or above the soil surface have been explored. Tomography and other advanced imaging technologies are generally susceptible to technical issues and are not conducive to soil measurements outside the laboratory. Embodiments provided herein may provide a rapid, accurate, mobile approach for describing the volume of roots, performance of roots and how subterranean plant parts are distributed below ground. Such information may be valuable to geneticists and plant breeders participating in the crop improvement process.

Some embodiments of the present disclosure are directed to apparatus and methods that enable rapid detection and assessment of soil compaction while offering further insight into the readiness of soil for plant growth, construction or other uses. Components corresponding to such embodiments may include machine learning structures and/or operations. In some embodiments, neural networks and/or other machine learning processes may facilitate interpretation of data. Most importantly, real time machine learning may provide effective functionality across a wide range of soil types and conditions. The inclusion of machine learning and other forms of artificial intelligence (AI) in embodiments disclosed herein may overcome limitations of both conventional and experimental methods. For example, the inclusion of machine learning and other forms of AI may provide effective functionality across the disparate range of soil types and/or conditions encountered in the field.

Some embodiments provide that a subterranean burst of compressed air lifts the soil surface in proportion to the degree of soil compaction at and below the soil depth where the burst of compressed air is released. Since movement of the soil surface may be a consequence of back pressure related to soil density and condition at the time of compressed air injection, the magnitude and distance of lift from the point of air injection may offer direct quantitative insight into soil tilth. Heretofore, tilth has been a qualitative concept and its measurement has been the subject of speculative and unproven indices.

Some embodiments include a highly-mobile vehicle that is self-propelled, autonomous, driven, pushed and/or pulled. For example, the vehicle may be an all-terrain vehicle (ATV), truck, motorcycle and/or robot, among others. In some embodiments, the vehicle transports an apparatus that may include, among others: an onboard computer with Global Positioning System (GPS) and real time data transmission capabilities to and from a cloud or hybrid cloud computing environment; a source of compressed air; valves and gauges controlled by the onboard computer that deliver consistent bursts of compressed air at specific pressures from the source of compressed air; hardened, hollow, metal probes that are connected to the source of compressed air such that air can move freely through the hollow probes and exit via holes near the tip of the metal probes; one or more hydraulic cylinders that force the probes into the soil to predetermined depths; a "skirt," that may be a thin plate of metal, plastic or composite material, that surrounds the hollow soil probes and that sits flush on the soil surface while the probe is in the ground; a digital air pressure gauge attached to the hydraulic cylinder and/or integrated into the probe's skirt; and a laser technology device, including but not limited to a LiDAR unit, a laser Doppler vibrometer (LDV), a single point laser vibrometer and/or scanning laser vibrometer.

In example use and operation, responsive to a computer-scheduled and/or manually-actuated burst of compressed air, an air burst occurs below ground. The digital air pressure gauge attached to the hydraulic cylinder or integrated into the probe's skirt may record the backpressure force and may transmit that the backpressure force data to the onboard computer. Independently and/or simultaneously, the laser technology device may record the soil lift at a single point and/or at multiple points near and away from the spot of compressed air injection. Soil lift data may be communicated to the onboard computer. In some embodiments, the onboard computer performs necessary calculations and may or may not interface with a hybrid cloud computing environment to visualize the soil physical health situation onsite. In this manner, embodiments herein may represent a novel utilization of laser vibrometry and other laser technologies, e.g., LiDAR, to assess soil physical health. Some embodiments provide that the entire process (latency) may take less than 10 seconds and that data corresponding to the air pressure gauge and laser may be complementary.

In addition to measuring soil lift in response to compressed air injection, embodiments herein may provide that the laser vibrometry may measure and/or scan the soil surface. In some embodiments, a laser device, such as a stationary laser, a laser mounted on a vehicle, a laser attached to the frame of an operating tillage implement and/or a laser attached to a robot or overhead unmanned aerial vehicle (UAV) measures soil vibration and characterizes disturbance of the soil surface. In this manner, agronomists and/or construction site managers may be informed regarding the performance of soil-moving and soil-penetrating machines.

In some embodiments, the laser device may be positioned on an implement, machine, robot and/or UAV in a manner that enables the laser device to scan the soil surface and/or to examine subsoil that is revealed by soil-moving and/or soil-penetrating machines.

In some embodiments, a laser device may be deployed from a mobile machine. Some embodiments provide that metal and/or composite soil probes modified to enable laser device use may be forced/delivered into the ground by the same hydraulic cylinders and apparatus used to inject compressed air. Once lowered into a plow layer, the laser housed in the probes may be used to examine physical characteristics of subsoil and relay data in (near) real time to a machine learning device that interprets the data and delivers actionable information to agronomists and/or civil engineers in the field.

Some embodiments herein may provide rapid and reliable methods, systems and/or apparatus for delivering compressed air, a laser device, scanning or otherwise, and/or a multispectral camera below ground. The three technologies (compressed air, a scanning laser or a camera), alone or in combination, and aided by machine learning and/or other forms of AI, can provide soil compaction, describe crop roots, root volume and distribution, soil aggregate stability, tilth and/or other soil characteristics in the proximity of crop roots. Some embodiments provide that the presence of diseased roots and nematodes in the subsoil may also be detected. Furthermore, some embodiments provide that laser backscatter can also be interpreted to learn more about soil conditions. Some embodiments may further include generating a "portfolio" of root characterization protocols that may be scalable across fields, landscapes and/or research enterprises.

Some embodiments of the present invention include scalable methods that employ compressed air injection and laser and/or acoustic based technologies to detect, visualize and quantify intra- and inter-field agricultural soil compaction in near real time. Embodiments may provide economic and environmental advantages to farmers because they provide a novel solution to the worsening problem of root-restricting, subsurface layers of soil created by heavy farm equipment traffic and/or natural soil formation processes. Embodiments herein may enable farmers to confidently forego prophylactic tillage (tillage in the absence of information about soil compaction) and to formulate an optimal tillage plan (deep tillage only when and where it is warranted) for large crop enterprises and acreage.

Some embodiments provide systems including a manually- or autonomously-operated all-terrain vehicle (ATV) that is equipped with a location device, such as a global positioning system (GPS). The vehicle may include a hardened, weather-resistant, laptop computer that directs and receives data from a hardware payload comprising two or more sensors that may be complementary, automated, and/or multimodal. The sensors are selected and integrated specifically for the purpose of optimizing geospatial detection and quantification of soil compaction in three dimensions. The multimodal sensor payload may provide hardware designed and operated specifically for the purpose of characterizing agricultural soil compaction.

In some embodiments, the sensor payload may include an airborne (above ground), not coupled-to the-ground, disruption sensing technology, such as an acoustic and/or laser vibrometer. Embodiments may further include a source of acoustic waves and a corresponding acoustic wave receiver. The acoustic components of embodiments may be deployed at or below the soil surface for soil compaction detection.

In some embodiments, the payload-bearing ATV moves across the soil surface to locations defined by geographic location data that corresponds to a compaction detection zone. Data from a location device, a soil disruption device and/or a disruption sensor are collected and transmitted directly to the hardened laptop. Some embodiments provide that the data are, via automated algorithms and analytics, unique to such embodiments, transformed, fused and combined with GPS coordinates and elevation data such that the location and depth of agricultural soil compaction may be defined. In some embodiments, field by field, the magnitude of the soil compaction problem may be diagnosed across a crop production enterprise. Pursuant to these calculations performed by the onboard laptop computer, embodiments may further include a telemetry device connected to the laptop computer. In some embodiments, the telemetry device may transmit the transformed and fused data directly to a multiaccess "edge" cloud computing environment where the data may be deposited into a "data lake" structure. Some embodiments provide that, in the cloud computing environment, additional algorithms, analytics and machine learning protocols may access and utilize data from the data lake structure to create a visual image of subsurface soil compaction.

The visual image may depict the portions of a geographical area, i.e. a field or landscape, that are compacted and where, in that geographical area, soil compaction exists that would restrict root growth and the depth of that root-restricting compaction. Fusion of elevation data, i.e. a digital elevation model, into this visualization of soil compaction is also performed to provide additional richness to the data. For a farmer, land manager or agronomist, inclusion of elevation data in the data fusion-visualization process puts subsurface soil compaction into context relative to slope, soil type, cultivar performance, fertilizer use efficiency and/or water use efficiency.

Use of the onboard laptop to perform the calculative workload and immediate movement of that mathematical work product into the aforementioned multi-access cloud computing environment via the onboard telemetry device gives the present embodiments extremely low latency. Additional calculations may be performed and data transformation may occur in the cloud computing environment. In this manner, a farmer or interested party can, via an internet interface and mobile telephone, tablet and/or computer, quickly view soil compaction within a field, among fields in a farming unit, across a landscape or throughout an entire crop production enterprise. Given the computational design and telemetry integrated into the present embodiments, agricultural soil compaction may be characterized in real to near real time.

Reference is now made to FIG. 1, which is a schematic rendering of a system for diagnosing soil characteristics and subterranean plant characteristics according to some embodiments. As illustrated, a highly-mobile vehicle, such as an all-terrain vehicle (ATV) may have a soil disruption device, such as a subsurface air injection device, that includes a hollow probe that may be inserted into the soil to inject compressed air below the soil surface. The soil disruption device may further include one or more positioning devices, such as hydraulic cylinders, pneumatic cylinders, and/or electrically operating positioning devices, that are operable to position the hollow tube into specific subsurface portions thereof. In some embodiments, the soil disruption device may further include gauges and/or valves that may be operable to provide air pressure information and/or to control the delivery of the compressed air to the hollow probe.

In some embodiments, a probe skirt may be attached to the hollow probe at a position that causes the probe skirt to contact the soil at locations around the hollow probe when the hollow probe is inserted into the soil. Some embodiments provide that the probe skirt is substantially parallel and is operative to provide air sealing at the perimeter thereof around the hollow probe when inserted into the soil. In some embodiments, the hollow probe and the probe skirt may be fixedly attached to one another and may be operative to move together. Some embodiments provide that the hollow probe and the probe skirt may not be attached to one another and may be configured to move independently using different positioning devices. For example, the hollow probe may be positioned using a first positioning device and the probe skirt may be positioned using a second positioning device.

Some embodiments further include a compressed air source that may provide compressed air to the hollow tube to provide one or more bursts of compressed air below the surface of the soil.

In some embodiments, a disruption sensor may be configured to measure the disruption of the soil that occurs responsive to bursts of compressed air that are injected into the soil. In some embodiments, the disruption sensor may use laser and/or acoustic measurements to generate the disruption data that may be based on the lift. For example, some non-limiting embodiments provide that the disruption sensor includes a laser vibrometer that can analyze a single point or area of the soil surface and/or may perform a scanning operation to generate one or more disruption values corresponding to the area adjacent the compaction detection location.

In some embodiments, a computing device, such as an onboard computer that includes a processor circuit may be supported by the vehicle and may receive, store and/or provide data for controlling the soil disruption device, measuring the disruption of the soil that occurs responsive to a burst of compressed air, and/or location data that corresponds to the compaction detection location. Some embodiments provide that the computer comprises a hardened weather-resistant laptop computer, but such embodiments are non-limiting as the computer may include a different form factor including mobile telephone, tablet, and/or fixedly mounted computer.

A location and/or navigation device may be provided in the vehicle and may generate geographic location information corresponding to the vehicle. For example, some embodiments provide that the location and/or navigation device comprises a differential geographic positioning system (GPS). Location data from the location and/or navigation device may be provided to the computer. In some embodiments, the computer may associate the location data with the data corresponding to the soil disruption device, the disruption sensor, and/or other environmental conditions. In this manner, the soil compaction data corresponding to each location that is traversed by the vehicle may be determined to provide location specific soil compaction data.

A telemetry device may transmit the location specific soil compaction data from the computer to a remote computer and/or data repository using any combination of wired and/or wireless communication protocols and/or technologies. In some embodiments, the remote computer may perform additional analysis and may generated a three-dimensional compaction map corresponding to the location specific soil compaction data among others.

Some embodiments provide that the processing circuit and/or a remote processing circuit may perform machine learning operations to provide the compaction values that are generated from the disruption data that is generated at the compaction detection location. According to some embodiments, some or all of the components described herein may be communicatively coupled to one another via distributed processing devices that may be referred to as cloud computing devices and/or systems.

In some embodiments, a tillage prescription plan that includes data identifying which areas of the soil should be tilled may be generated. The tillage prescription plan may further include data regarding how deep different areas should be tilled to overcome the soil compaction. In some embodiments, the tillage prescription plan may be transmitted to one or more agriculture vehicles that include automated tilling implements that are towed and/or mounted thereto. For example, digital instructions may be transmitted to a tractor cab to control the tilling implement to till the soil surface according to the tillage prescription plan.

By selectively tilling different portions of the soil surface, advantages may include time savings, fuel savings, equipment cost savings, green-house gas emission reductions, and ecological system damage reduction.

Some embodiments provide that field data collection is generated and a three-dimensional tillage prescription is generated. The three-dimensional tillage prescription plan may be transmitted to the cab of a tractor or other agriculture equipment and the tillage prescription plan may be executed by an on-board computer that is connected to hydraulic and/or pneumatic controls. Hydraulically controlled gauge wheels may control a ripper shank depth. The gauge wheels may move the ripper up and down to fracture shallow and deeper compacted layers in real time with the software automatically adjusting the tractor speed to during the operation.

Figure 2:
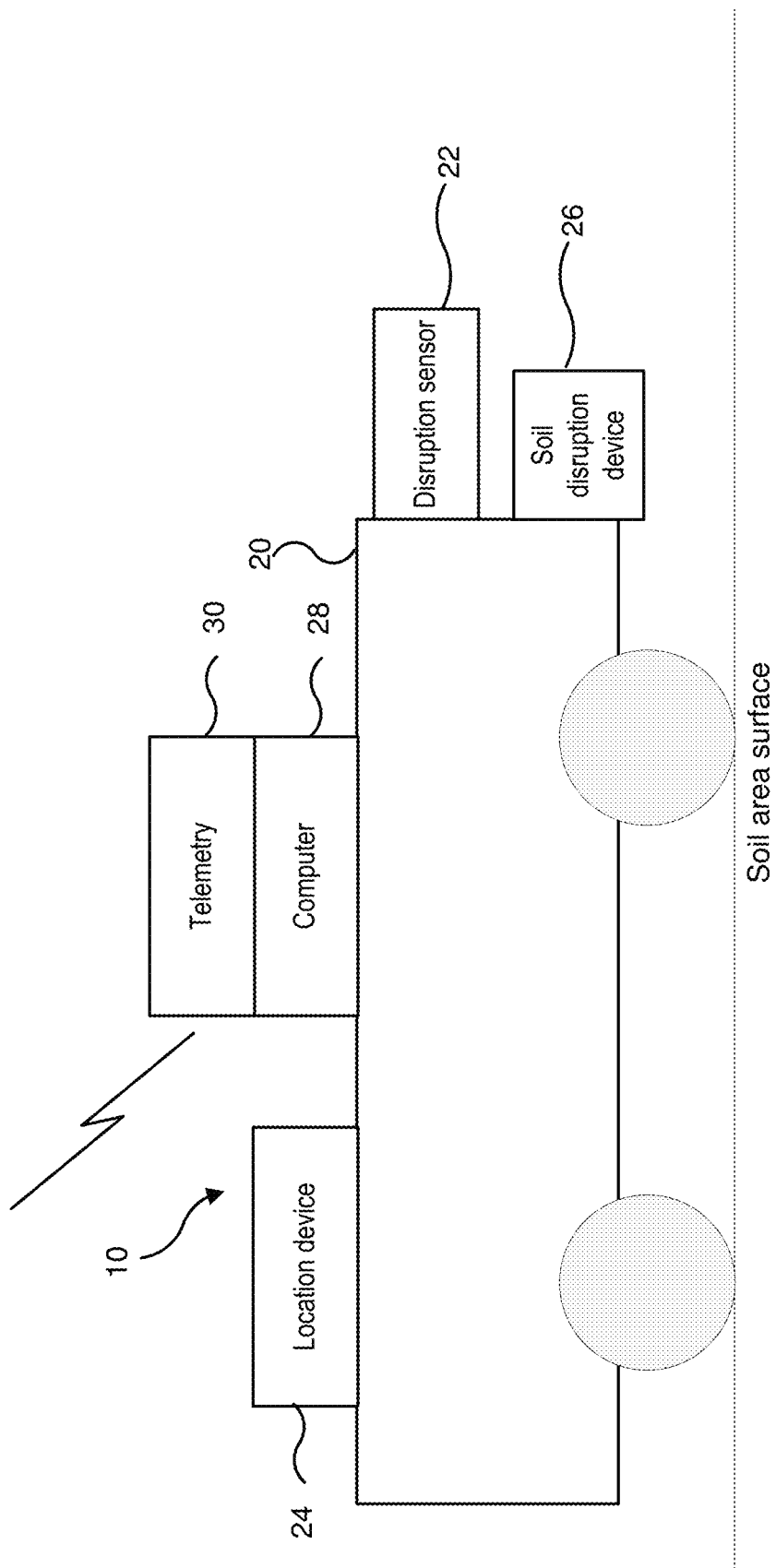
FIG. 2 is a schematic block diagram illustrating a system for diagnosing soil characteristics and subterranean plant characteristics according to some embodiments.

Reference is now made to FIG. 2, which is a schematic block diagram illustrating a system for diagnosing soil characteristics and subterranean plant characteristics according to some embodiments. A system 10 according to some embodiments includes a vehicle 20 that is configured to travel over a soil area to a compaction detection location. A location device 24 is configured to provide geographic location data corresponding to the vehicle 20 and that may be used to navigate to the compaction detection location. A soil disruption device 26 may be mounted to the vehicle 20 and may be positioned at the compaction detection location. In this manner, one or more bursts of compressed air may be subterraneously delivered at the compaction detection location.

The disruption sensor 22 is mounted to the vehicle to cause the at least one sensor to move above a surface of the soil area to the compaction detection location as the vehicle travels thereon and to generate data relating to a physical, chemical and/or biological characteristic of the soil corresponding to the compaction detection location. A computer 28 is communicatively coupled to the soil disruption device 26 and the disruption sensor 22 and to the location device 24. The computer may be configured to receive the geographic location data and the data relating to the physical, chemical and/or biological characteristic of the soil. The computer 28 may be further configured to generate location associated data relating to the physical, chemical and/or biological characteristic of the soil corresponding to the soil area.

In some embodiments, the data relating to the physical, chemical and/or biological characteristic of the soil correlates to soil bulk density. In some embodiments, soil bulk density may be expressed as soil compaction data. Some embodiments provide that the data relating to the physical, chemical and/or biological characteristic of the soil includes soil moisture.

Some embodiments provide that the soil area includes multiple soil area elements. For example, a soil element may correspond to a specific area, size and/or shape of the soil surface. In some embodiments, each soil area element corresponds to a specific geographic location and a corresponding location associated soil compaction data value.

Some embodiments include a sensor support that is configured to physically support the soil disruption device 26 and the disruption sensor 22 and to be pulled across the surface of the soil area by the vehicle 20. In some embodiments, the sensor support is and/or includes a self-propelled vehicle that is separate from the vehicle or towed vehicle that is coupled to the vehicle. Some embodiments provide that the location associated soil compaction data includes elevation data corresponding to the soil compaction.

In some embodiments, the vehicle comprises a self-driving vehicle and is configured to traverse the soil area in a path that is defined by a coverage plan that is based on the geographic location data. For example, a terrestrially operating vehicle such as a self-driving ATV, cart, or tractor may use the location data in conjunction with a coverage plan to traverse the soil are in the predefined path.

Although some embodiments are described herein as systems that include a vehicle 20, such embodiments are non-limiting as systems described herein may not include the vehicle as part of the system. In some embodiments, the systems according to some embodiments may be able to be installed on different vehicles and/or types thereof. In this manner, a system may be provided to a user that is able to provide the vehicle to support the system.

Figure 3:
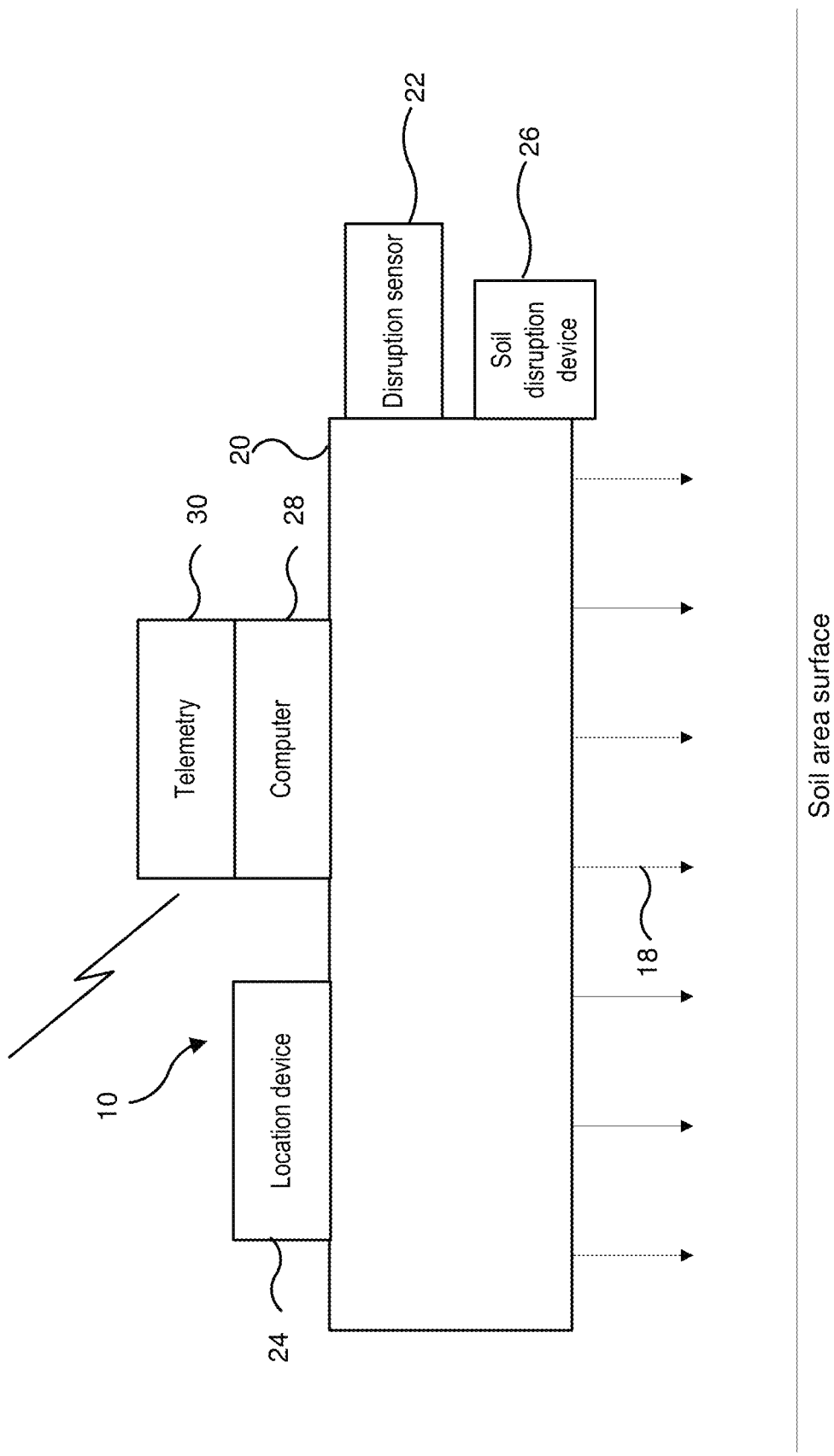
FIG. 3 is a schematic block diagram illustrating a system as described in FIG. 2 including an airborne vehicle according to some embodiments.

Brief reference is now made to FIG. 3, which is a schematic block diagram illustrating a system as described in FIG. 2 including an airborne vehicle according to some embodiments. In some embodiments, the vehicle comprises an airborne vehicle and is configured to fly over the soil area based on self-generated lift 18. In some embodiments, the airborne vehicle is an autonomously flying drone that operates according to a predefined coverage plan that may define elevation, speed and path. Some embodiments provide that the drone is tethered to a ground station and/or another vehicle while other embodiments provide that the drone is untethered. In some embodiments, the drone may include telemetry 30 for transmitting the generated data during and/or after flight. Some embodiments provide that the drone include on board memory for storing the generated data.

In some embodiments, the airborne vehicle is configured to fly over the soil area in a pattern that is defined by a coverage plan that is based on the geographic location data. Although the airborne vehicle is illustrated as including the soil disruption device 26 and the disruption sensor 22, embodiments herein provide that one or the other may be mounted thereto.

Referring back to FIG. 2, some embodiments provide that the computer 28 is further configured to generate a tillage prescription plan for the soil area that is based on the location associated soil compaction data. In some embodiments, the tillage prescription plan includes data that identifies a first portion of soil area not to till and a second portion of the soil area to till. Some embodiments provide that the tillage prescription plan includes data that identifies multiple different portions of the soil surface wherein each portion may correspond to a different tilling depth. In some embodiments, the tillage prescription plan includes three-dimensional tillage data that defines a location corresponding to a portion of the soil area and a tilling depth that corresponds to the location. In some embodiments, the three-dimensional tillage data is graphically represented based on data derived from the soil disruption device and/or disruption sensor.

Some embodiments provide that the computer 28 is coupled to telemetry 30 for transmitting tillage prescription data to a tilling vehicle that includes a tilling implement. Although not illustrated, embodiments herein contemplate that various intervening devices and/or equipment may be in a communication path between the computer 28 and a tilling implement. The tilling vehicle and/or the tilling implement are configured to implement the tillage prescription plan by varying tillage depth based on a tilling location.

In some embodiments, the tilling implement is propelled by the tilling vehicle. Some embodiments provide that the tilling implement varies the tilling depth based on using an electrical, mechanical and/or hydraulic positioning component to vary the vertical action of the tilling implement and thus the tilling depth. Some embodiments provide that the tilling implement is mounted to the tilling vehicle and is manually adjusted to vary the tilling depth. In some embodiments, the tillage prescription plan is implemented automatically by the tilling vehicle and/or the tilling implement.

Some embodiments provide that the computer 28 is located at the vehicle and that a second computer is remote from the vehicle 20. The computer 28 may be further configured to generate the location associated soil compaction data and to transmit the location associated compaction data to a data repository that is accessible by the second computer. In some embodiments, the second computer is configured to receive the location-associated soil compaction data and/or to generate a tillage prescription plan for the soil area that is based on the location associated soil compaction data. In some embodiments, the second computer is further configured to transmit the tillage prescription plan to a tilling vehicle.

In some embodiments, the computer 28 is further configured to generate the location associated physical, chemical and/or biological characteristic data of the soil and to generate a tillage prescription plan for the soil area that is based on the location-associated physical, chemical and/or biological characteristic data.

Some embodiments provide that a stand-off sensor may traverse the top surface of the soil without substantially penetrating and/or otherwise disturbing the soil. Whereas soil resistance, soil density and soil compaction, i.e. hard soil that resists root penetration and water movement, may generally be estimated via invasive methods that may include penetrometers, probes and/or shovels, embodiments herein may employ active sensors, in contrast to passive sensors, that generate data that, in turn, may be combined or fused to provide an estimate of soil resistance, density and/or compaction. That estimate may be derived in substantially real time without penetrating the soil surface. In this manner, sensors according to some embodiments may be non-invasive and may be referred to as "standoff" sensors.

In some embodiments, the data relating to the physical, chemical and/or biological characteristics of the soil includes a correlation with a soil aggregate stability value. As used herein, the term "soil aggregate stability" refers to a quantitative soil health parameter that refers to the ability of soil to bind together in "aggregates" that provide pore space and that may resist the influence of outside forces, e.g. driving rain, heavy axle loads and/or excessive tillage, among others. Good soil aggregate stability suggests that a soil is not overly dense or compacted. In some embodiments, the data relating to the physical, chemical and/or biological characteristic of the soil includes a correlation with an organic matter content value. The organic matter content value may refer to the amount of organic content determined to be in the soil at a given location. In some embodiments, the data relating to the physical, chemical and/or biological characteristic of the soil includes a correlation with a soil tilth value.

Soil tilth is an expression that describes the ability of plowed soils to support crop growth. For example, based on the combination of compressed air injection and laser vibrometry, we may be able to describe and quantify soil compaction and/or soil tilth and thereby provide in-field soil health assessments. The ability to describe and quantify compaction and/or soil tilth may eliminate and/or reduce the need to perform other, more disruptive measurements to determine soil bulk density. Soil bulk density ($gm/cm_3$ volume of a soil sample), soil aggregate stability (weight of sieved aggregates/total dry or wet weight of a soil sample) and soil tilth (combined stability of aggregated soil particles, moisture content and degree of aeration) may all uniquely describe the physical condition of soil and the site-specific ability of a soil to support crop production. All three parameters may manifest soil compaction, if present. Some embodiments provide that all three parameters can be highly correlated with measurements described herein to make valid inferences about soil heath that can be improved via machine learning. Soil compaction, soil aggregate stability and/or soil tilth may lend themselves to novel estimation based on measurements described herein paired with machine learning. Some embodiments provide that the soil tilth value may be determined in addition to a soil compaction data value.

Figure 4:
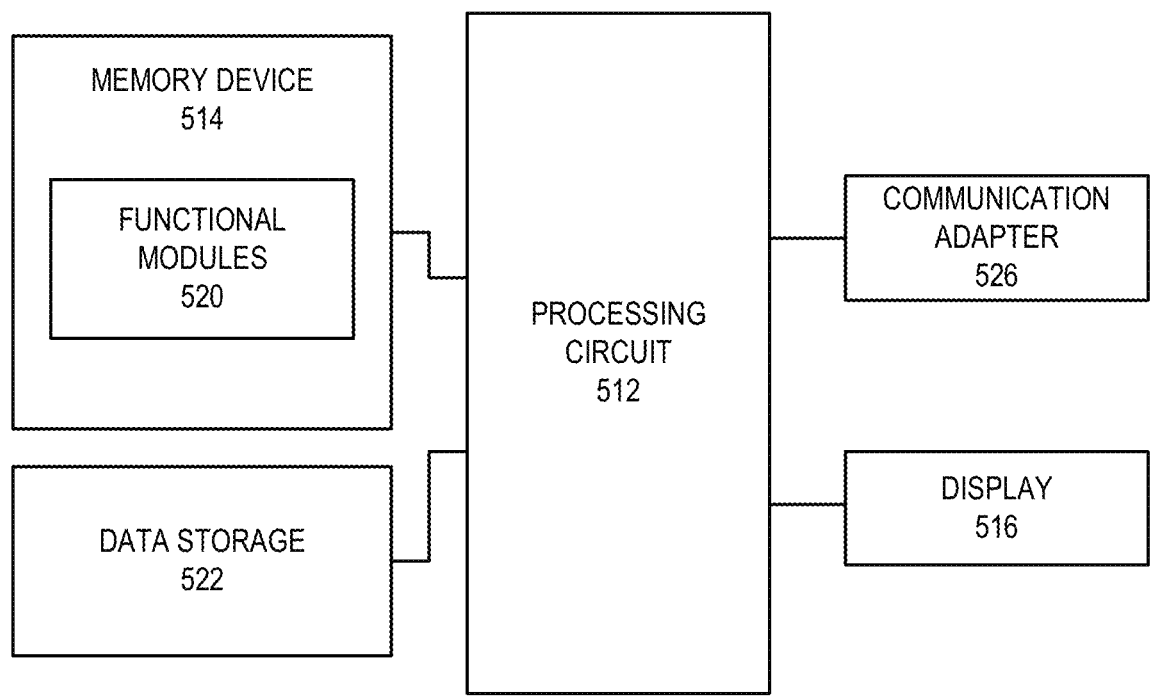
FIG. 4 is a schematic block diagram illustrating an electronic configuration for a computer according to some embodiments.

FIG. 4 is a schematic block diagram illustrating an electronic configuration for a computer according to some embodiments. As shown in FIG. 4, the computer 28 may include a processing circuit 512 that controls operations of the computer 28. Although illustrated as a single processing circuit, multiple special purpose and/or general-purpose processors and/or processor cores may be provided in the computer 28. For example, the computer 28 may include one or more of a video processor, a signal processor, a sound processor and/or a communication controller that performs one or more control functions within the computer 28. The processing circuit 512 may be variously referred to as a "controller," "microcontroller," "microprocessor" or simply a "computer." The processor may further include one or more application-specific integrated circuits (ASICs).

Various components of the computer 28 are illustrated as being connected to the processing circuit 512. It will be appreciated that the components may be connected to the processing circuit 512 through a system bus, a communication bus and controller, such as a USB controller and USB bus, a network interface, or any other suitable type of connection.

The computer 28 further includes a memory device 514 that stores one or more functional modules 520.

The memory device 514 may store program code and instructions, executable by the processing circuit 512, to control the computer 28. The memory device 514 may also store other data such as image data, event data, user input data, and/or algorithms, among others. The memory device 514 may include random access memory (RAM), which can include non-volatile RAM (NVRAM), magnetic RAM (ARAM), ferroelectric RAM (FeRAM) and other forms as commonly understood in the gaming industry. In some embodiments, the memory device 514 may include read only memory (ROM). In some embodiments, the memory device 514 may include flash memory and/or EEPROM (electrically erasable programmable read only memory). Any other suitable magnetic, optical and/or semiconductor memory may operate in conjunction with the gaming device disclosed herein.

The computer 28 may further include a data storage device 522, such as a hard disk drive or flash memory. The data storage device 522 may store program data, player data, audit trail data or any other type of data. The data storage device 522 may include a detachable or removable memory device, including, but not limited to, a suitable cartridge, disk, CD ROM, DVD or USB memory device.

Some embodiments provide that the soil compaction threshold may be determined by a soil compaction measurement of about 0 $g/cm3$ to about 2.5 $g/cm^3$. Some embodiments provide that the soil compaction threshold may be determined by a soil compaction measurement of about 1.0 $g/cm^3$ to about 2.0 $g/cm^3$. Some embodiments provide that the soil compaction threshold may be determined by a soil compaction measurement of about 1.2 $g/cm^3$ to about 1.8 $g/cm^3$. In some embodiments, the soil compaction threshold may correlate to a soil density value.

In some embodiments, the data set regarding a physical aspect of the soil is analyzed with a neural network. A neural network according to some embodiments includes a training set that includes a data set regarding the soil area. The data set may include weather, physical, chemical, structural, topographical, and/or geographical data. In some embodiments, a visualization of the soil compaction data set may depict the soil area and may be displayed in at least two dimensions. For example, some embodiments provide that the visualization may be displayed in three or more dimensions. Some embodiments provide that a prescription for tilling the soil area may be based on the visualization of the data set. In some embodiments, the at least two dimensions include depth and density of the soil area and the visualization includes at least one other dimension.

Although discussed herein as including neural networks for processing and/or analyzing data, some embodiments herein may rely on one or more algorithms including statistical and/or machine learning techniques. Such labelling techniques may include, but are not limited to labeling of data with semi-supervised classification, labeling of data with unsupervised classification, DBSCAN, and/or K-means clustering, among others. Such classification techniques may include, but are not limited to linear models, ordinary least squares regression (OLSR), stepwise regression, multivariate adaptive regression splines (MARS), locally estimated scatterplot smoothing (LOESS), ridge regression, least absolute shrinkage and selection operator (LASSO), elastic net, least-angle regression (LARS), logistic regression, decision tree, other tree-based algorithms (e.g. ADA-Boost), support vector machine, and neural network based learning. Neural network-based learning may include feed forward neural networks, convolutional neural nets, recurrent neural nets, long/short term memory neural, auto encoders, generative adversarial networks [especially for synthetic data creation], radial basis function network, and any of these can be referred to as "deep" neural networks. Additionally, ensembling techniques to combine multiple models, bootstrap aggregating (bagging), random forest, gradient boosted models, and/or stacknet may be used.

Additionally, in some embodiments, training data may optionally be transformed using dimension reducing techniques, such as principal components analysis, among others.

Some embodiments provide a mobile, self-propelled, soil health and management laboratory (MSHML). It can be operated autonomously or manually. The MSHML payload may include compressed air injection devices that are configured to inject bursts of compressed air into the soil at prescribed depths and/or pressures and for specified durations. The MSHML payload may further comprise a laser vibrometer that is configured to measure the disruption of the soil that occurs responsive to the bursts of compressed air. In this manner, systems herein may collect and fuse information about physical, chemical and biological characteristics of soil. Embodiments provide a data upload capability and communications link that connects the MSHML to a cloud computing environment.

In some embodiments, placement of the soil disruption device and disruption sensor onto an autonomous, all-terrain vehicle (ATV), and integration of those devices with a location device with other digital technologies, on and off the ATV constitute an automated, standoff method for assessing soil health and quality. Via the machine and methods presented herein, one can collect, transmit and display reliable information about physical, chemical and biological characteristics of soil in near real time, in effect, delivering essential information a farmer needs to manage for a healthy soil. Some embodiments provide a near real time assessment of soil health, delivered in a context suitable for crop producer use. In some embodiments, the MSHML is a self-propelled suite of devices, sensors and technologies used in combination for the purpose of monitoring soil health. Some embodiments include an ATV that can be operated manually or autonomously. The ATV may transport an automated, payload consisting of devices described herein. Other components on the ATV are integrated with the payload. Components include a power source, an electrical converter, a computer hardened for outdoor use, a differential global positioning system (GPS), a conventional or multispectral camera and a wireless data communication system. Collectively, the "stacked" payload and these elements provide near real time wireless transmission of data describing physical, chemical and biological characteristics of soil into a cloud computing enterprise.

Some embodiments use commercial technology to wirelessly transmit data directly into a computing environment architecture, such as a hybrid enterprise cloud, the enterprise being a data lake, i.e. a database configuration that: manages structured and unstructured data, supports visual analytics and facilitates machine learning focused upon below ground attributes of soil. Therein, computer code, algorithms and analytics fuse data from the respective sensors to generate unique visualizations and assessments relevant to soil health and management.

In some embodiments, in a directed sampling mode, responding to wireless commands from its laptop control station, the machine moves to the desired latitude and longitude in a farm field. In some embodiments, the MSHML uses a nearest neighbor, statistical algorithm that considers historical productivity, elevation and other parameters to select optimum sampling sites. Finally, the MSHML can be programmed to grid sample, i.e. to collect measurements at coordinates corresponding to a grid, e.g. the 2.5-acre to 5.0-acre grid that is commonly used for variable rate fertilizer application.

In some embodiments, a processing device, such as the computer 28 referenced in FIGS. 2-4, may be removable and/or fixably mounted to and/or supported by a vehicle 20. In some embodiments, the processing circuit 512 may be configured to receive, from a location device, geographic location data corresponding to a location of the vehicle. The processing circuit 512 may be further configured to receive, from a sensor that is proximate the vehicle, data relating to a physical, chemical and/or biological characteristic of a soil area. The processing circuit 512 may further generate location associated data that relates the geographic location data to the physical, chemical and/or biological characteristic of the soil area at respective locations corresponding to the geographic location data.

In some embodiments, the soil area includes multiple soil area elements that may each correspond to a specific geographic location and a corresponding location associated soil compaction data value. Some embodiments provide that each soil area element includes an area that is in a range from about one square foot to about ten acres.

Some embodiments further include a sensor support that is configured to physically support the devices described herein and to be propelled across the surface of the soil area by the vehicle 20.

In some embodiments, the location associated data includes location associated soil compaction data that includes elevation data corresponding to soil compaction.

As provided herein and referring to FIGS. 1-4, systems may include a soil disruption device that is configured to cause a disruption of a subsurface portion of soil at a compaction detection location and a disruption sensor that is configured to generate disruption data corresponding to the disruption of the subsurface portion of the soil at the compaction detection location.

In some embodiments, the soil disruption device includes a compressed air injection device that is configured to deliver a burst of compressed air into the subsurface portion of the soil at a compaction detection location. Some embodiments provide that the soil disruption device includes a hollow probe that is configured to receive compressed air at a proximal end and to transmit compresses air at a distal end that is opposite the proximal end and that is inserted into the soil.

In some embodiments, systems may include a compressed air source that is configured to store the compressed air that is received at the proximal end of the hollow probe. The hollow probe may include a hardened point at a distal end of the hollow probe that is opposite the proximal end of the hollow tube. Some embodiments provide a compressed air controller that is configured to determine a delivery property corresponding to the compressed air that is received at the proximal end of the hollow probe. Examples of a delivery property include one or more of the delivered air pressure of the burst of compressed air, the quantity of bursts of compressed air in a sequence of bursts of compressed air, and the duration of the burst of compressed air.

In some embodiments, the burst of compressed air includes multiple bursts that may be separated in time. In some embodiments, such bursts are the same duration while in other embodiments the bursts have a different duration from one another.

Some embodiments provide a positioning device that is coupled to the hollow probe and that is configured to insert the hollow probe into the soil at the compaction detection location. In some embodiments, the positioning device includes a hydraulic cylinder and/or a pneumatic cylinder. Some embodiments provide that there are multiple hydraulic or pneumatic cylinders.

Some embodiments provide that the distal end of the hollow probe includes multiple holes that direct the compressed air in multiple directions in the soil.

In some embodiments, a probe skirt may surround the hollow probe when the hollow probe is inserted into the soil. Some embodiments provide that the probe skirt contacts a surface of the soil that surrounds the hollow probe when the hollow probe is inserted into the soil. In this manner, an air sealing effect may be accomplished corresponding to the soil surface at the compaction detection location.

In some embodiments, the probe skirt includes a metal and/or composite material.

Some embodiments provide that the system includes a location device that is configured to provide geographic location data corresponding to the compaction detection location.

In some embodiments, the disruption sensor includes a laser that is configured to generate the disruption data that corresponds to vibration signals that are generated by a burst of compressed air that is subterraneously discharged in the compaction detection location. Some embodiments provide that the disruption sensor includes at least one of a laser vibrometer, a scanning laser, a laser Doppler vibrometer, a scanning laser Doppler vibrometer and/or a LiDAR unit to generate the disruption data for the compaction detection location. In some embodiments, the disruption sensor includes an acoustic sensor that is configured to measure acoustic signals that are generated by a burst of compressed air that is subterraneously discharged in the compaction detection location.

Some embodiments provide that the system includes a processor circuit that is configured to receive the geographic location data from the location device and the disruption data from the disruption sensor and to associate the geographic location data with the disruption data. In some embodiments, the processor circuit is configured to generate a soil compaction value that is based on the disruption data and that corresponds to the geographic location data.

Some embodiments of the system include a vehicle that is configured to travel over a soil area that includes multiple compaction detection locations. In some embodiments, wherein the vehicle is configured to support the soil disruption device, the disruption sensor, the location device and the processor circuit. In some embodiments, the vehicle is a manned vehicle and/or an autonomously operated vehicle. Some embodiments provide that the vehicle includes a propulsion device that is configured to cause the vehicle to be propelled across the soil area in a given pattern and/or direction and at a given speed to and/or from compaction detection locations.

In some embodiments, the vehicle includes a towing coupler that is configured to mechanically couple the vehicle to a towing vehicle. Embodiments provide that the towing vehicle may be configured to push and/or pull the vehicle across the soil area.

In some embodiments, the processor circuit transmits a control signal to the vehicle that causes the vehicle to travel over a portion of the soil area. In some embodiments, the processor circuit is configured to include machine learning computer program instructions to use the disruption data and the location data to generate soil compaction data at the compaction detection location.

In some embodiments, the processor circuit is communicatively coupled to the soil disruption device, the disruption sensor, the location device, at least one environmental sensor, a positioning device, a vehicle, a compressed air device and/or a propulsion device. In such embodiments, the processor circuit may send, receive and/or store data corresponding to the different connected devices and/or elements.

Some embodiments include a memory that is coupled to the processor circuit and that is configured to store data that is provided to and/or generated by the processor circuit. The system may include a wireless data transmission device that is configured to transmit data from the memory to a remote communication device that is coupled to a remote computing device.

Systems according to some embodiments include a compressed air source that is configured to provide compressed air to the proximal end of the hollow probe and a positioning device that is coupled to the hollow probe and that is configured to insert the distal end of the hollow probe into the soil. In some embodiments, in response to the processor circuit receiving data that is generated by the location device and that corresponds to a given location, the processor circuit is further configured to cause the positioning device to force a distal end of the hollow probe into the soil to a given depth.

Systems according to some embodiments include a compressed air source that is configured to provide compressed air to the proximal end of the hollow probe and a positioning device that is coupled to the hollow probe and that is configured to insert the distal end of the hollow probe into the soil.

Some embodiments provide that the burst of compressed air includes a first burst of compressed air and a second burst of compressed air that is supplied after the first burst of compressed air. The first burst of compressed air is supplied responsive to the distal end of the hollow probe being at a first depth in the soil and the second burst of compressed air is supplied responsive to the distal end of the hollow probe being at a second depth in the soil that is different from the first depth in the soil.

Some embodiments provide that the disruption sensor includes a laser, a laser vibrometer and/or a scanning vibrometer, that is configured to be directed to an area corresponding to the compaction detection location and that is above and/or below a surface of the soil that corresponds to the geographic location. In some embodiments, the disruption sensor is configured to measure soil movement that occurs above and col-ocated with and/or adjacent the compaction detection location and to generate soil movement data, and to transmit the soil movement data to the processor circuit.

Some embodiments provide that the disruption sensor is attached to the soil disruption device and is lowered to or into the soil based on movement of the soil disruption device.

In some embodiments, the disruption sensor includes a laser that is directed at a portion of soil area that is disturbed by action of a tillage implement.

Some embodiments provide that the disruption sensor includes a laser that is configured to determine and characterize contents of structure of the subsurface portion of soil and that the contents include at least one of soil aggregates, pore space, organic matter, and living organisms including nematodes, plant roots, and/or other soil dwelling organisms.

In some embodiments, the disruption sensor is further configured to generate data that corresponds to performance of tillage equipment.

Some embodiments provide that the processor circuit includes machine learning computer program product that, when executed by the processing circuit, generates machine learning operations that are configured to quantify subsurface soil compaction. In some embodiments, the machine learning computer program product generates machine learning operations that are configured to generate a three-dimensional depiction of the soil surface. Some embodiments provide that machine learning operations that are configured to generate three-dimensional soil compaction and tilth maps using data corresponding to injection of compressed air and laser vibrometry.

In some embodiments, the disruption sensor includes a laser vibrometer that is configured to operate as an acoustic receiver to detect and/or measure seismic waves created by a burst of subterranean compressed air and/or sound introduced into the soil.

Figure 5:
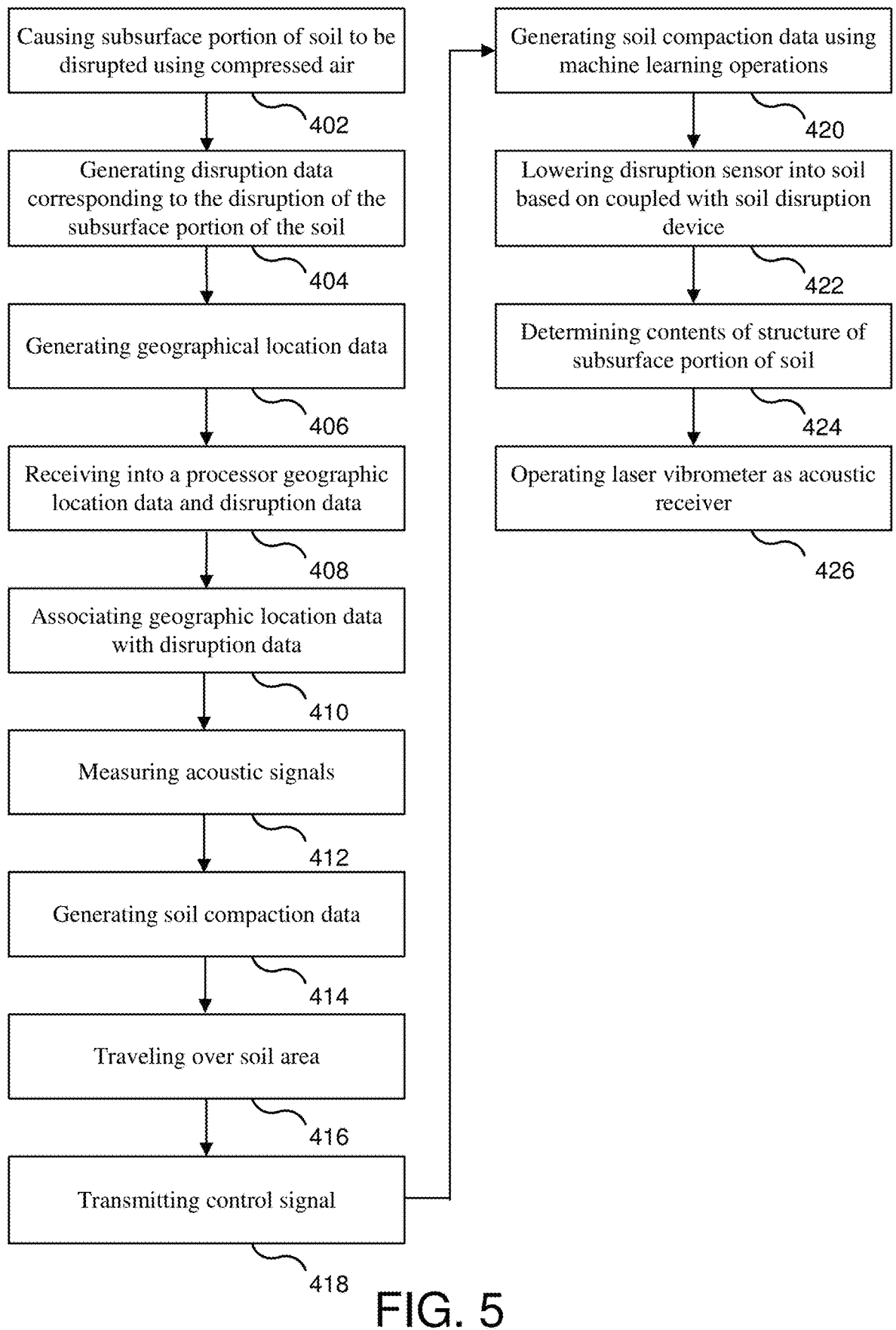
FIG. 5 is a flowchart of operations according to some embodiments herein.

Reference is now made to FIG. 5, which is a flowchart for operations according to some embodiments disclosed herein. Operations include causing a subsurface portion of soil at a compaction detection location to be disrupted using compressed air (block 402) and generating disruption data corresponding to the disruption of the subsurface portion of the soil at the compaction detection location (block 404). In some embodiments, causing the subsurface portion of soil to be disrupted includes delivering a burst of compressed air into the subsurface portion of the soil at the compaction detection location. Some embodiments provide that delivering the burst of compressed air into the subsurface portion of the soil includes transmitting compressed air via a distal end of a hollow probe that is configured to receive compressed air at a proximal end thereof. Some embodiments include inserting the hollow probe into the soil at the compaction detection location using a positioning device that is coupled to the hollow probe.

Operations include generating geographic location data corresponding to the compaction detection location (block 406) and receiving the geographic location data from the location device and the disruption data from the disruption sensor (block 408).

Operations include associating the geographic location data with the disruption data (block 410).

Some embodiments further include determining a delivery property corresponding to the compressed air that is received at the proximal end of the hollow probe. In some embodiments, the delivery property includes at least one of a delivered air pressure of the burst of compressed air, a quantity of bursts of compressed air in a sequence of bursts of compressed air, and a duration of the burst of compressed air.

Some embodiments provide that transmitting compressed air via the distal end of a hollow probe includes transmitting the compressed air using multiple openings at the distal end of the hollow probe. In some embodiments, the multiple openings are oriented in different directions from the hollow probe.

Some embodiments include contacting a surface of the soil when the hollow probe is inserted into the soil using a probe skirt that surrounds the hollow probe when the hollow probe is inserted into the soil. In some embodiments, the probe skirt may be substantially planar and may form an air seal with the soil when the hollow probe is inserted into the soil.

Some embodiments include generating the disruption data that corresponds to vibration signals that are generated by a burst of compressed air that is subterraneously discharged in the compaction detection location.

Some embodiments include measuring acoustic signals that are generated by a burst of compressed air that is subterraneously discharged in the compaction detection location (block 412). Additionally, in some embodiments, a soil compaction value that is based on the disruption data and that corresponds to the geographic location data may be generated (block 414).

Some embodiments include travelling over a soil area that includes multiple compaction detection locations using a vehicle that is configured to support the soil disruption device, the disruption sensor, the location device and the processor circuit (block 416). Some embodiments include transmitting a control signal to the vehicle that causes the vehicle to travel over a portion of the soil area (block 418).

Some embodiments include generating soil compaction data using machine learning computer program instructions that use the disruption data and the location data to generate soil compaction data at the compaction detection location (block 420). Some embodiments include generating data that corresponds to performance of tillage equipment. Some embodiments include performing machine learning operations that are configured to quantify subsurface soil compaction. In some embodiments, machine learning operations are configured to generate a three-dimensional depiction of the soil surface.

Some embodiments include performing machine learning operations that are configured to generate three-dimensional soil compaction and tilth maps using data corresponding to injection of compressed air and laser vibrometry.

In some embodiments, the compressed air includes a first burst of compressed air and a second burst of compressed air that is supplied after the first burst of compressed air. In such embodiments, the first burst of compressed air is supplied responsive to the distal end of the hollow probe being at a first depth in the soil and the second burst of compressed air is supplied responsive to the distal end of the hollow probe being at a second depth in the soil that is different from the first depth in the soil.

Some embodiments include measuring soil movement that occurs above and adjacent the compaction detection location, generating soil movement data, and transmitting the soil movement data to the processor circuit.

Operations according to some embodiments include lowering the disruption sensor to the soil based on movement of the soil disruption device (block 422). For example, some embodiments provide that the disruption sensor is configured to be positioned based on the positioning of the soil disruption device.

Some embodiments include determining contents of structure of the subsurface portion of soil (block 424). Some embodiments provide that the contents include at least one of soil aggregates, pore space, organic matter, and living organisms including nematodes, plant roots, and/or other soil dwelling organisms.

Some embodiments include operating a laser vibrometer as an acoustic receiver to detect and/or measure seismic waves created by a burst of subterranean compressed air and/or sound introduced into the soil (block 426).

Figure 6:
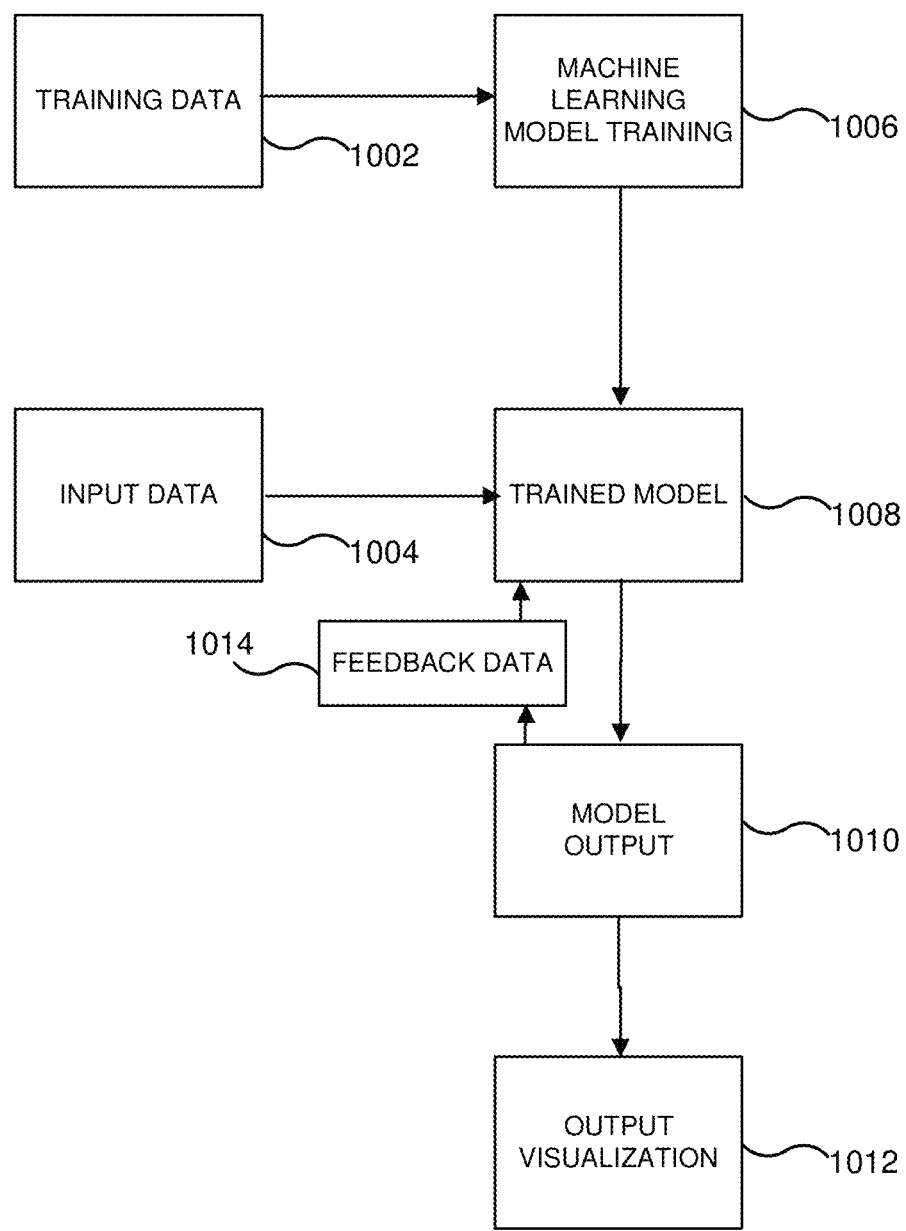
FIG. 6 is a flowchart of operations for training and using a machine learning model for operations according to some embodiments disclosed herein.

Reference is now made to FIG. 6, which is a flowchart of operations for training and using a machine learning model for operations according to some embodiments disclosed herein. Some embodiments provide that training data (block 1002) is provided to a machine learning platform as disclosed herein. The machine learning platform may perform machine learning model training using the training data that is provided (block 1006). The training data may include disruption data, soil compaction data, and/or compressed air delivery data, among others. The training data values may all be georeferenced according to some embodiments herein. In some embodiments, training data may include air and/or ground temperature, volumetric moisture content, digital elevation model images, soil probe results, penetrometer readings, core samples, acoustic in-situ measurements, in-situ ultrasound measurements, and/or excavation analysis, among others. The machine learning model may be trained using any of the techniques described herein, including, for example, random forest, among others. The result of the training may include a trained machine learning model (block 1008).

Once the machine learning model is trained, input data 1004 may be provided to the model, which may generate model output data 1010. The input data 1004 may include disruption data, soil compaction data, and/or compressed air delivery data, among others and the trained model 1008 may predict a penetrometer reading at each inch down to a given depth for every location that includes the scanned data. In some embodiments, the given depth may be about 12 inches, about 18 inches, about 24 inches, and/or about 36 inches, among others. The model output data 1010 may include predicted and/or estimated penetrometer curves that may be used to understand soil density and the presence of compacted layers thereof. In some embodiments, a compaction threshold may be determined and any values in the predicted penetrometer data that are above the compaction threshold may be designated for tillage while compaction values that are below the compaction threshold may not be designated for tillage.

The model output data 1010 may be used to generate an output visualization (block 1012). For example, the values that are above the compaction threshold that are designated for tillage may be marked as red while the values that are not above the compaction threshold may be marked with a color other than red in the visualization.

In some embodiments, the model output data 1010 may be used as feedback 1014 that may be provided to the trained model 1008 to increase the performance of the trained model 1008.

Further Definitions and Embodiments:

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A system comprising:
   a soil disruption device that is configured to cause a disruption of a subsurface portion of soil at a compaction detection location;
   a disruption sensor that is configured to generate disruption data corresponding to the disruption of the subsurface portion of the soil at the compaction detection location;
   a location device that is configured to provide geographic location data corresponding to the compaction detection location; and
   a processor circuit that is configured to receive the geographic location data from the location device and the disruption data from the disruption sensor and to associate the geographic location data with the disruption data, wherein the processor circuit comprises machine learning computer program product that, when executed by the processing circuit, generates machine learning operations that are configured to generate three-dimensional soil compaction and tilth maps using data corresponding to injection of compressed air and laser vibrometry.

2. The system of claim 1, wherein the disruption sensor comprises at least one of a laser vibrometer, a scanning laser, a laser Doppler vibrometer, a scanning laser Doppler vibrometer and/or a LiDAR unit that is configured to generate the disruption data for the compaction detection location.

3. The system of claim 1, wherein the processor circuit is further configured to generate a soil compaction value that is based on the disruption data and that corresponds to the geographic location data.

4. The system of claim 1, further comprising a vehicle that is configured to travel over a soil area that includes a plurality of compaction detection locations,
wherein the vehicle is configured to support the soil disruption device, the disruption sensor, the location device and the processor circuit.

5. The system of claim 4, wherein the vehicle includes a propulsion device that is configured to cause the vehicle to be propelled across the soil area in a given pattern and/or direction and at a given speed.

6. The system of claim 1, wherein the processor circuit is further configured to comprise machine learning computer program instructions to use the disruption data and the location data to generate soil compaction data at the compaction detection location.

7. The system of claim 1, wherein the soil disrupter comprises a hollow probe that includes a distal end and a proximal end,
wherein the system further comprises: a compressed air source that is configured to provide compressed air to the proximal end of the hollow probe; and a positioning device that is coupled to the hollow probe and that is configured to insert the distal end of the hollow probe into the soil, and
wherein responsive to the processor circuit receiving data that is generated by the location device and that corresponds to a given location, the processor circuit is further configured to cause the positioning device to force a distal end of the hollow probe into the soil to a given depth.

8. The system of claim 1, wherein the soil disrupter comprises a hollow probe that includes a distal end and a proximal end,
wherein the system further comprises: a compressed air source that is configured to provide compressed air to the proximal end of the hollow probe; and a positioning device that is coupled to the hollow probe and that is configured to insert the distal end of the hollow probe into the soil, and
wherein responsive to the processor circuit receiving data that is generated by the location device and that corresponds to a given location, the processor circuit is further configured to cause a burst of compressed air to be supplied by the compressed air source and to the proximal end of the hollow probe into the soil to a given depth.

9. The system of claim 8, wherein the burst of compressed air comprises a first burst of compressed air and a second burst of compressed air that is supplied after the first burst of compressed air, and
wherein the first burst of compressed air is supplied responsive to the distal end of the hollow probe being at a first depth in the soil and the second burst of compressed air is supplied responsive to the distal end of the hollow probe being at a second depth in the soil that is different from the first depth in the soil.

10. The system of claim 1, wherein the disruption sensor is attached to the soil disruption device and is lowered to and/or into the soil based on movement of the soil disruption device.

11. The system of claim 1, wherein the disruption sensor comprises a laser that is directed at a portion of soil area that is disturbed by action of a tillage implement.

12. The system of claim 1, wherein the disruption sensor comprises a laser that is configured to determine and characterize contents of structure of the surface and/or subsurface portion of soil, and wherein the contents comprise at least one of soil aggregates, pore space, organic matter, and living organisms including nematodes, plant roots, and/or other soil dwelling organisms.

13. The system of claim 1, wherein the machine learning operations are further configured to generate a three-dimensional depiction of the soil surface.

14. The system of claim 1, wherein the disruption sensor comprises a laser vibrometer that is configured to operate as an acoustic receiver to detect and/or measure seismic waves created by a burst of subterranean compressed air and/or sound introduced into the soil.

15. A method comprising:
causing a subsurface portion of soil at a compaction detection location to be disrupted using injected compressed air;
generating disruption data using laser vibrometry, the disruption data corresponding to the disruption of the subsurface portion of the soil at the compaction detection location;
generating geographic location data corresponding to the compaction detection location;
receiving the geographic location data from the location device and the disruption data from the disruption sensor;
associating the geographic location data with the disruption data, and
generating machine learning operations to generate three-dimensional soil compaction and tilth maps using data corresponding to the injection of compressed air and laser vibrometry.

16. The method of claim 15, further comprising determining a delivery property corresponding to the compressed air that is received at the proximal end of the hollow probe,
wherein the delivery property includes at least one of a delivered air pressure of the burst of compressed air, a quantity of bursts of compressed air in a sequence of bursts of compressed air, and a duration of the burst of compressed air.

17. The method of claim 15, further comprising:
measuring soil movement that occurs above and adjacent the compaction detection location;
generating soil movement data; and
transmitting the soil movement data to the processor circuit.

18. The method of claim 15, further comprising generating data that corresponds to performance of tillage equipment.

19. The method of claim 15, operating a laser vibrometer as an acoustic receiver to detect and/or measure seismic waves created by a burst of subterranean compressed air and/or sound introduced into the soil.

* * * * *